United States Patent [19]

Quantz

[11] 4,441,414
[45] Apr. 10, 1984

[54] CRACKING DIE ASSEMBLY FOR HIGH PRODUCTION NUT CRACKING APPARATUS

[75] Inventor: James B. Quantz, Columbia, S.C.

[73] Assignee: Machine Design Incorporated, Columbia, S.C.

[21] Appl. No.: 509,917

[22] Filed: Jul. 1, 1983

Related U.S. Application Data

[60] Continuation-in-part of Ser. No. 372,305, Apr. 27, 1982, Pat. No. 4,418,617, which is a division of Ser. No. 199,743, Oct. 23, 1980, Pat. No. 4,332,827.

[51] Int. Cl.³ .............................................. A23N 5/02
[52] U.S. Cl. .................................... 99/571; 99/574
[58] Field of Search .............. 99/568, 571, 572, 573, 99/574, 575, 577–579, 580, 581–583, 486, 489, 491; 426/481, 482; 30/120.1–120.5

[56] References Cited

U.S. PATENT DOCUMENTS

| | | | |
|---|---|---|---|
| 2,065,376 | 12/1936 | Kidd | 99/574 X |
| 3,561,513 | 2/1971 | Lindsey | 99/571 |
| 3,621,898 | 11/1971 | Turner | 99/571 |
| 3,841,212 | 10/1974 | Powell | 99/571 |
| 3,871,275 | 3/1975 | Quantz | 99/571 |
| 4,332,827 | 6/1982 | Quantz | 99/574 X |

Primary Examiner—Timothy F. Simone
Attorney, Agent, or Firm—Bell, Seltzer, Park & Gibson

[57] ABSTRACT

A cracking die assembly is disclosed which is adapted for use in a high production nut cracking apparatus of the type wherein a nut is held between an anvil and cracking die, and a shuttle then impacts against the rear end surface of the cracking die to sharply advance the cracking die and thereby crack the shell of the nut. The cracking die assembly includes a mounting sleeve having a bore with an internal shoulder, and a retainer mounted within a portion of the sleeve bore and having an opposing shoulder. The cracking die has a radial flange mounted between the two shoulders so as to permit limited movement in the axial direction, and a unitary annular resilient gasket is disposed between the flange of the die and one of the shoulders, with the gasket being designed to block passage of foreign substances past the cracking die, as well as to absorb at least a portion of the impacting force from the shuttle.

12 Claims, 3 Drawing Figures

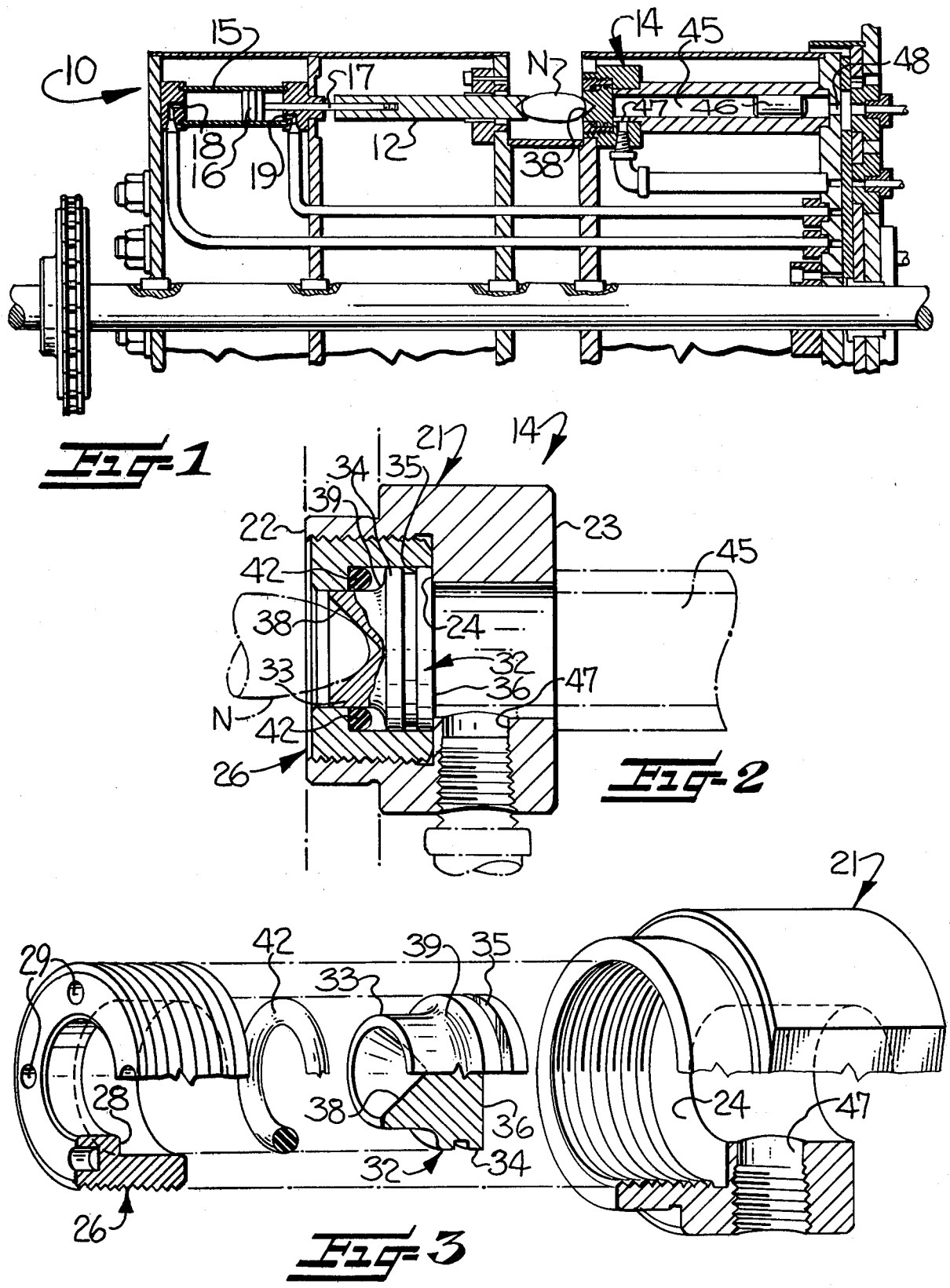

CRACKING DIE ASSEMBLY FOR HIGH PRODUCTION NUT CRACKING APPARATUS

The present application is a continuation in part of copending application Ser. No. 372,305, filed Apr. 27, 1982, now U.S. Pat. No. 4,418,617 which in turn is a division of application Ser. No. 199,743, filed Oct. 23, 1980 now U.S. Pat. No. 4,332,827.

The present invention generally relates to an improved cracking die assembly for use in a high production nut cracking apparatus.

In applicant's prior U.S. Pat. No. 3,871,275, there is disclosed a high production nut cracking apparatus wherein a plurality of cracking units are arranged on a rotatable turret, with each cracking unit having an opening adapted to receive an individual nut which is dropped from a feed conveyor as the cracking unit moves through its top center position. Each cracking unit includes an anvil mounted on one side of the opening, and a cracking die mounted for limited movement on the other side of the opening and so that the anvil and cracking die are adapted to receive and hold the nut therebetween. A free floating shuttle is mounted rearwardly of the die, and the shuttle is thrust forwardly into impacting engagement with the rearward side of the cracking die after the nut is received in the opening, and so that the shell of the retained nut will be cracked by the resulting forward movement of the die.

Applicant's prior U.S. Pat. No. 4,332,827 and copending application Ser. No. 372,305 disclose a similar high production nut cracking apparatus, which includes a nut feeding conveyor by which the nuts are singularized and oriented prior to being delivered to the individual cracking units.

In nut cracking apparatus of the described type, the cracking die is subjected to rapidly repeated impacts, and it is thus susceptible to rapid wear and failure. In addition, the cracking die tends to become coated with oil and shell fragments from the cracked nuts, which interfere with the proper functioning of the die and further contribute to its rapid wear. As a result, the cracking die is a limiting factor in obtaining the desired high speed of operation, low maintenance, and long life of the apparatus.

It is accordingly an object of the present invention to provide a cracking die assembly adapted for use in a high speed nut cracking apparatus of the described type, and which effectively avoids the above noted problems associated with prior constructions.

It is a more particular object of the present invention to provide a cracking die assembly of the described type, and which possesses sufficient inherent strength to withstand rapidly repeated impacts, and which effectively precludes the passage of oil and shell fragments rearwardly past the die and its supporting retainer.

These and other objects and advantages of the present invention are achieved in the embodiment of the invention specifically illustrated herein by the provision of a cracking die assembly which includes a mounting sleeve having an internal bore which includes a radial shoulder. A tubular retainer is mounted in the bore of the sleeve and includes an internal bore having an oppositely facing shoulder. A cracking die is disposed coaxially within the bore of the sleeve, and includes a radial flange disposed between the retainer shoulder and sleeve shoulder. Also, a resilient annular gasket is disposed between the radial flange of the die and one of either the sleeve shoulder or the retainer shoulder, and so as to be disposed on the side of the flange toward the end surface of the die which is adapted to engage the nut. Thus upon the opposite end surface of the die being struck by a shuttle, the die will be thrust forwardly a limited distance to impart a cracking force to a nut engaged by the adjacent end surface of the die.

In the preferred embodiment, the annular gasket is sized so as to contact both the adjacent surface of the die and the adjacent surface of either the sleeve bore or retainer bore and so that the gasket physically blocks the passage of foreign substances past the die, and also is adapted to absorb at least a portion of the impacting force to the die.

Some of the objects of the invention having been stated, other objects and advantages will appear as the description proceeds, when taken in connection with the accompanying drawings, in which FIG. 1 is a fragmentary sectional side elevation view of a nutcracking apparatus which embodies the features of the present invention;

FIG. 2 is an enlarged sectional view of the cracking die assembly of the apparatus illustrated in FIG. 1; and FIG. 3 is an exploded perspective view of the cracking die assembly.

Referring more particularly to the drawings, there is illustrated in FIG. 1 a cracking unit 10 of a high production nutcracking apparatus which embodies the features of the present invention. While a single unit 10 is illustrated, it will be understood that in a preferred embodiment, several such units are mounted on a rotatable turret as disclosed in applicant's prior U.S. Pat. Nos. 3,871,275 and 4,332,827.

The cracking unit 10 comprises an anvil 12, a cracking die assembly 14, and means mounting the anvil and cracking die assembly in an axially aligned, opposed relationship to define an opening for receiving a nut N therebetween. More particularly, the means for mounting the anvil 12 includes a first air cylinder 15, a piston 16 slideably disposed within the cylinder, a piston rod 17 interconnecting the piston and anvil, a first air port 18 disposed adjacent the rearward end of the cylinder 15, and a second air port 19 disposed adjacent the forward end of the cylinder. As will be apparent, movement of the piston 16 results in a corresponding movement of the anvil 12, either forwardly toward the cracking die assembly 14 or rearwardly therefrom. Such movement is controlled by air which is selectively provided to the first and second ports in a manner more fully disclosed below, and as further described in applicant's above noted prior patents.

The cracking die assembly 14 includes a mounting sleeve 21 defining a forward end 22 and a rearward end 23, and which has a stepped internal cylindrical bore which includes a forwardly facing radial shoulder 24 intermediate the ends so as to define a forward end portion on the left side of the shoulder 24 as seen in the drawings, and a rearward end portion on the right side of the shoulder.

A tubular retainer 26 is coaxially mounted in the forward end portion of the sleeve bore, and the retainer 26 includes a stepped internal cylindrical bore which includes a rearwardly facing radial shoulder 28 intermediate its ends and which is spaced oppositely from the sleeve shoulder. Thus the retainer defines a forward cylindrical bore portion on the forward (or left) side of the retainer shoulder 28 and a rearward cylindrical bore portion on the rearward (or right) side of the shoulder 28. The retainer is removably mounted in the sleeve bore by means of cooperating threads, and a plurality of indentations 29 are provided in the forward end face of the retainer to permit the retainer to be mechanically gripped by a suitable spanner wrench for rotation relative to the sleeve and removal therefrom to facilitate periodic cleaning or repair.

A cracking die 32 is mounted coaxially within the retainer 26. The die 32 is preferably composed of a solid metallic material, such as an aluminum alloy, and includes a cylindrical forward end portion 33 closely received within the forward bore portion of the retainer 26, and a radial cylindrical flange 34 disposed within the rearward bore portion of the retainer. The flange 34 is further disposed between the retainer shoulder 28 and the sleeve shoulder 24, and the flange has an axial dimension less than the distance between the shoulders for permitting limited axial movement of the die. The flange 32 also includes an annular outwardly facing channel 35 in the outer periphery thereof which is adapted for receiving a sealing ring or the like therein, if desired. The die 32 further includes a generally flat rearward end surface 36 and a forward end surface having an axial depression 38 formed therein which is adapted to receive a portion of a nut N to be cracked. The axial depression 38 is of conical cross sectional configuration, and the juncture between the cylindrical forward end portion 33 and the radial flange 34 includes a rounded fillet 39 to strengthen the same.

A resilient annular gasket 42 of a relatively hard elastomeric or other rubber-like material encircles the cylindrical forward end portion 33 of the die, and is disposed between the radial flange 34 of the die and the retainer shoulder 28. Preferably, the gasket 42 is of a unitary annular configuration, and of circular cross section, with its inner diameter closely corresponding to that of the forward end portion 33 of the die, and its outer diameter closely corresponding to that of the rearward bore portion of the retainer 26. By this arrangement, the annular gasket 42 contacts both of the contiguous surfaces of the die and retainer and "rolls" along these surfaces by turning inside out during the axial movement of the die. The gasket thereby serves to physically block the passage of foreign substances past the cracking die, and it also may absorb at least a portion of the impacting force as described more fully below.

The cracking die assembly 14 further includes a second air cylinder 45 mounted coaxially at the rearward end of the sleeve 21, and a free floating shuttle 46 is mounted within the air cylinder 45. In addition, there is provided an air port 47 adjacent the forward end of the cylinder, and a further port 48 which extends axially through the rearward end of the cylinder.

The control system for cyclically actuating the cracking unit includes an air control system whereby air is selectively introduced into the four ports 18, 19, 47, and 48. More particularly, upon receiving a nut N in the opening between the anvil 12 and cracking die assembly 14, air is first introduced into the port 18 so that the piston 16 and anvil 12 are moved forwardly and such that the anvil 12 operatively engages one end of the nut N in the opening. The nut thereby becomes supported between the anvil 12 and die 32, and the force provided by the anvil acts through the nut to move the cracking die rearwardly so that the flange 34 contacts the shoulder 24, as seen in FIG. 2. The anvil 12 and cracking die 32 thereby also serve to compressively stress the retained nut. High pressure air is next injected through the port 48 and into the air cylinder 45, such that the shuttle 46 is thrust forwardly along the cylinder and impacts against the rear end surface 36 of the cracking die, causing the cracking die to sharply advance a short distance forwardly against the nut and thereby crack its shell. In the absence of a nut in the opening, the gasket 42 will absorb the entire impacting force, and even during normal cracking it is believed the gasket may absorb at least a portion of the impacting force. The air in front of the advancing shuttle is permitted to exhaust through the port 47. Air next enters the port 19, causing the piston 16 and anvil 12 to move rearwardly and release the nut, and as a final step, air is caused to enter the port 47 and thereby return the shuttle 46 to its rearward position. The apparatus is then in position to receive another nut to be cracked, with the above cycle being cyclically repeated. Further details regarding the air control system for cyclically actuating the unit 10 may be obtained from applicant's above noted prior patents, the disclosures, of which are expressly incorporated herein by reference.

In the drawings and specification, there has been set forth a preferred embodiment of the invention, and although specific terms are employed, they are used in a generic and descriptive sense only and not for purposes of limitation.

That which is claimed is:

1. A cracking die assembly adapted for use in a nut-cracking apparatus, and comprising
    a mounting sleeve having an internal bore which includes a radial shoulder intermediate its ends,
    a tubular retainer coaxially mounted in said sleeve bore, said retainer including an internal bore and a radial shoulder which is spaced oppositely from said sleeve shoulder,
    a cracking die disposed coaxially within said bore of said sleeve and including a radial flange disposed between said retainer shoulder and said sleeve shoulder, with said flange having an axial dimension less than the distance between said shoulders for permitting limited axial movement of said die, and with said die having a first end surface which is adapted to engage the end of a nut to be cracked, and an opposite end surface, and
    resilient annular gasket means disposed between said radial flange of said die and one of either said sleeve shoulder or said retainer shoulder, and so as to be disposed on the side of said flange toward said first end surface of said die,
    whereby said cracking die is adapted to be impacted on said opposite end surface and be thrust forwardly a limited distance so as to impart a cracking force to a nut engaged by said first end surface of said die, and with the annular gasket means adapted to absorb at least a portion of the impacting force.

2. The cracking die assembly as defined in claim 1 wherein said die includes a cylindrical portion extending between said flange and said first end surface, and wherein said resilient annular gasket means comprises a unitary gasket of circular cross section which is disposed about and contacts said cylindrical portion about its entire periphery.

3. The cracking die assembly as defined in claim 2 wherein said gasket contacts the entire periphery of the bore of either said retainer or sleeve so as to physically block the passage of foreign substances past said cracking die.

4. The cracking die assembly as defined in claim 3 wherein said retainer is removably mounted in said sleeve bore by means of cooperating threads.

5. The cracking die assembly as defined in claim 4 wherein said first end surface of said die includes an axial depression for receiving an end portion of a nut to be cracked.

6. A cracking die assembly adapted for use in a nut-cracking apparatus, and comprising
- a mounting sleeve defining a forward end and a rearward end and having an internal bore which includes a forwardly facing radial shoulder intermediate said ends to define a forward end portion on one side of said shoulder and a rearward end portion on the other side of said shoulder,
- a tubular retainer coaxially mounted in the forward end portion of said sleeve bore, said retainer including an internal bore which includes a rearwardly facing radial shoulder intermediate its ends and which is spaced oppositely from said sleeve shoulder, and so as to define a forward cylindrical bore portion on the forward side of said retainer shoulder and a rearward cylindrical bore portion on the rearward side of said retainer shoulder,
- a cracking die including a cylindrical forward end portion closely received within the forward bore portion of said retainer, and a radial flange disposed within said rearward bore portion of said retainer and between said retainer shoulder and said sleeve shoulder, with said flange having an axial dimension less than the distance between said shoulders for permitting limited axial movement of said die, and with said die having a generally flat rearward end surface and a forward end surface having an axial depression formed therein which is adapted to receive a portion of a nut to be cracked,
- resilient annular gasket means encircling said cylindrical forward end portion of said die and disposed between said radial shoulder of said die and said retainer shoulder,
- whereby said cracking die is adapted to be impacted on said rearward end surface and be thrust forwardly a limited distance so as to impart a cracking force to a nut received in said axial depression at the forward end surface of the die, and with the annular gasket means adapted to absorb at least a portion of the impacting force.

7. The cracking die assembly as defined in claim 6 wherein said resilient annular gasket means comprises a unitary annular gasket having an inner diameter contacting the entire periphery of said cylindrical forward end portion of said die, and an outer diameter contacting the entire periphery of said rearward bore portion of said retainer, whereby said annular gasket serves to physically block the passage of foreign substances past said cracking die.

8. The cracking die assembly as defined in claim 7 wherein said axial depression formed in said forward end surface is of conical cross sectional configuration, and wherein the juncture between said cylindrical forward end portion and said radial flange of said die includes a rounded fillet to strengthen the same.

9. In a nut cracking apparatus comprising a cracking die having a forward end surface and a rearward end surface, an anvil mounted opposite said forward end surface of said die to define an opening therebetween which is adapted to receive a nut, means mounting said cracking die for limited movement toward and away from said opening, means mounting said anvil for limited movement toward and away from said opening and for biasing said anvil in a direction toward said opening so that a nut may be retained between said anvil and said cracking die, a free floating shuttle mounted rearwardly of said cracking die, and means for periodically thrusting said shuttle forwardly into impacting engagement with said rearward end surface of said cracking die such that a nut retained between said anvil and said cracking die will be cracked by the resulting forward movement of the cracking die, the improvement wherein said cracking die is included in a cracking die assembly which comprises
- a mounting sleeve having an internal bore which includes a radial shoulder intermediate its ends,
- a tubular retainer coaxially mounted in said sleeve bore, said retainer including an internal bore and a radial shoulder which is spaced oppositely from said sleeve shoulder,
- said cracking die being disposed coaxially within said bore of said sleeve and including a radial flange disposed between said retainer shoulder and said sleeve shoulder, with said flange having an axial dimension less than the distance between said shoulders for permitting limited axial movement of said die, and with said die having a forward end surface which is adapted to engage the end of a nut to be cracked, and an opposite rearward end surface, and
- resilient annular gasket means disposed between said radial flange of said die and one of either said sleeve shoulder or said retainer shoulder, and so as to be disposed on the side of said flange toward said forward end surface of said die,
- whereby said cracking die is adapted to be impacted on said rearward end surface and be thrust forwardly a limited distance so as to impart a cracking force to a nut received between said anvil and forward end surface of said die, and with the annular gasket means adapted to absorb at least a portion of the impacting force.

10. The cracking die assembly as defined in claim 9 wherein said shoulder of said sleeve faces forwardly, and said retainer is mounted forwardly of said sleeve shoulder so that said retainer shoulder faces rearwardly, and said die includes a forward end portion which is closely received within the portion of said bore of said retainer which is forward of said retainer shoulder, and with said die flange disposed within the portion of said bore of said retainer which is rearward of said retainer shoulder.

11. The cracking die assembly as defined in claim 10 wherein said resilient annular gasket means encircles said forward end portion of said die and comprises a unitary annular gasket having an inner diameter contacting the entire periphery of said forward end portion and an outer diameter contacting the entire periphery of said rearward bore portion of said retainer, whereby said annular gasket serves to physically block the passage of foreign substances past said cracking die.

12. The cracking die assembly as defined in claim 11 wherein said flange of said die includes an annular outwardly facing channel in the outer periphery thereof which is adapted for receiving a sealing ring or the like therein.

* * * * *